July 23, 1929. P. D. THROPP ET AL 1,721,842
TIRE MAKING MACHINE
Filed Jan. 13, 1923   5 Sheets-Sheet 1

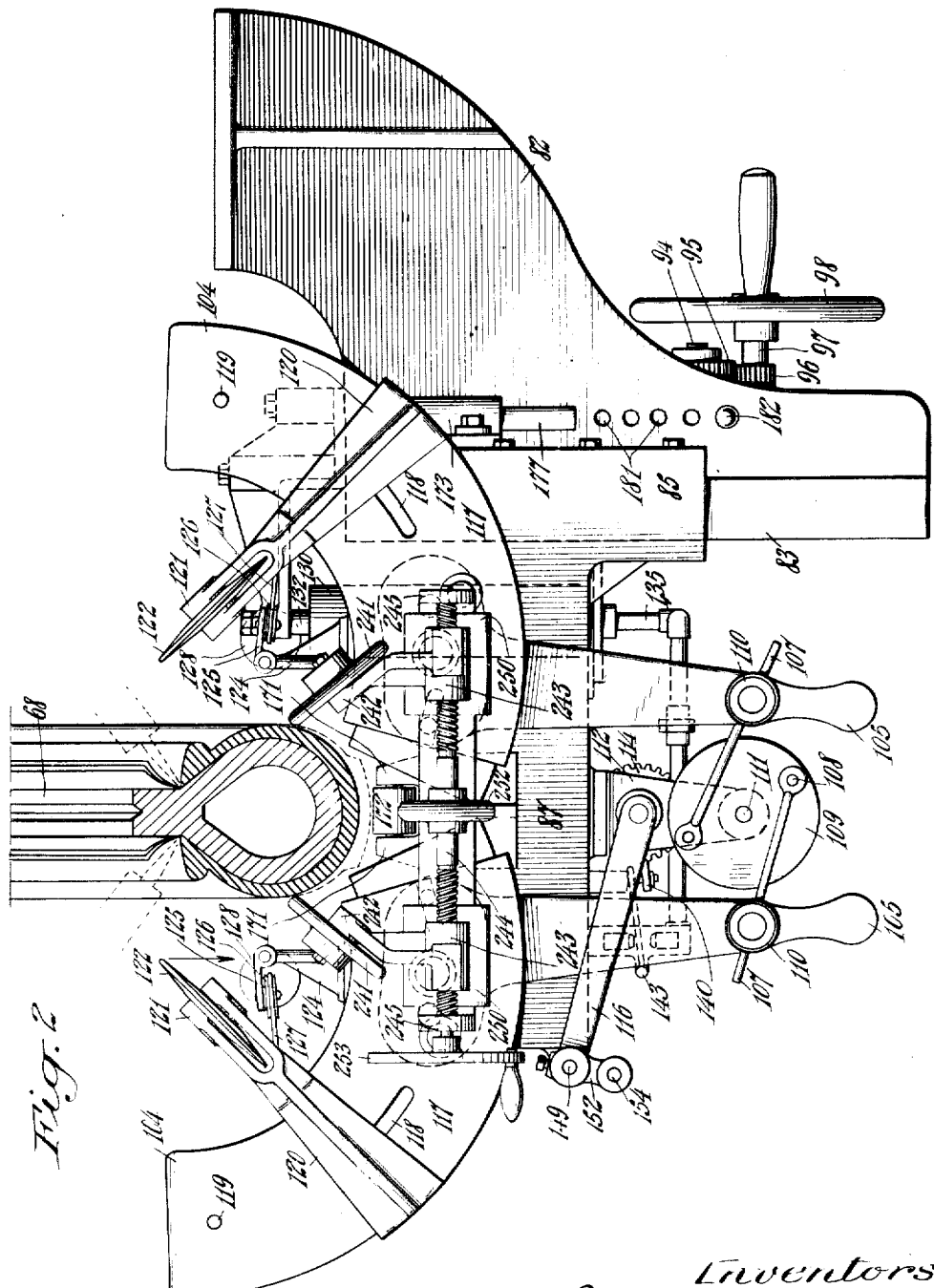

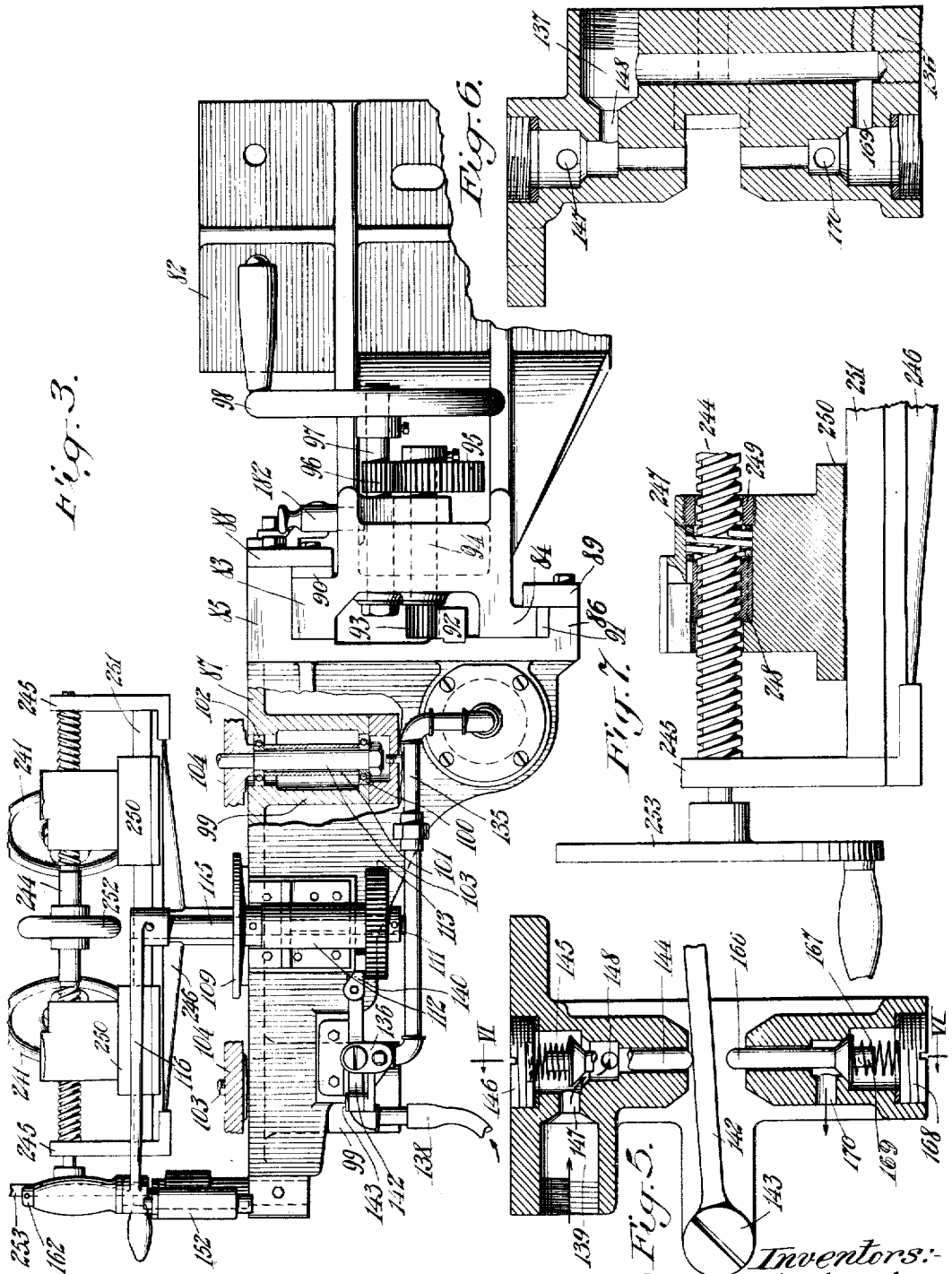

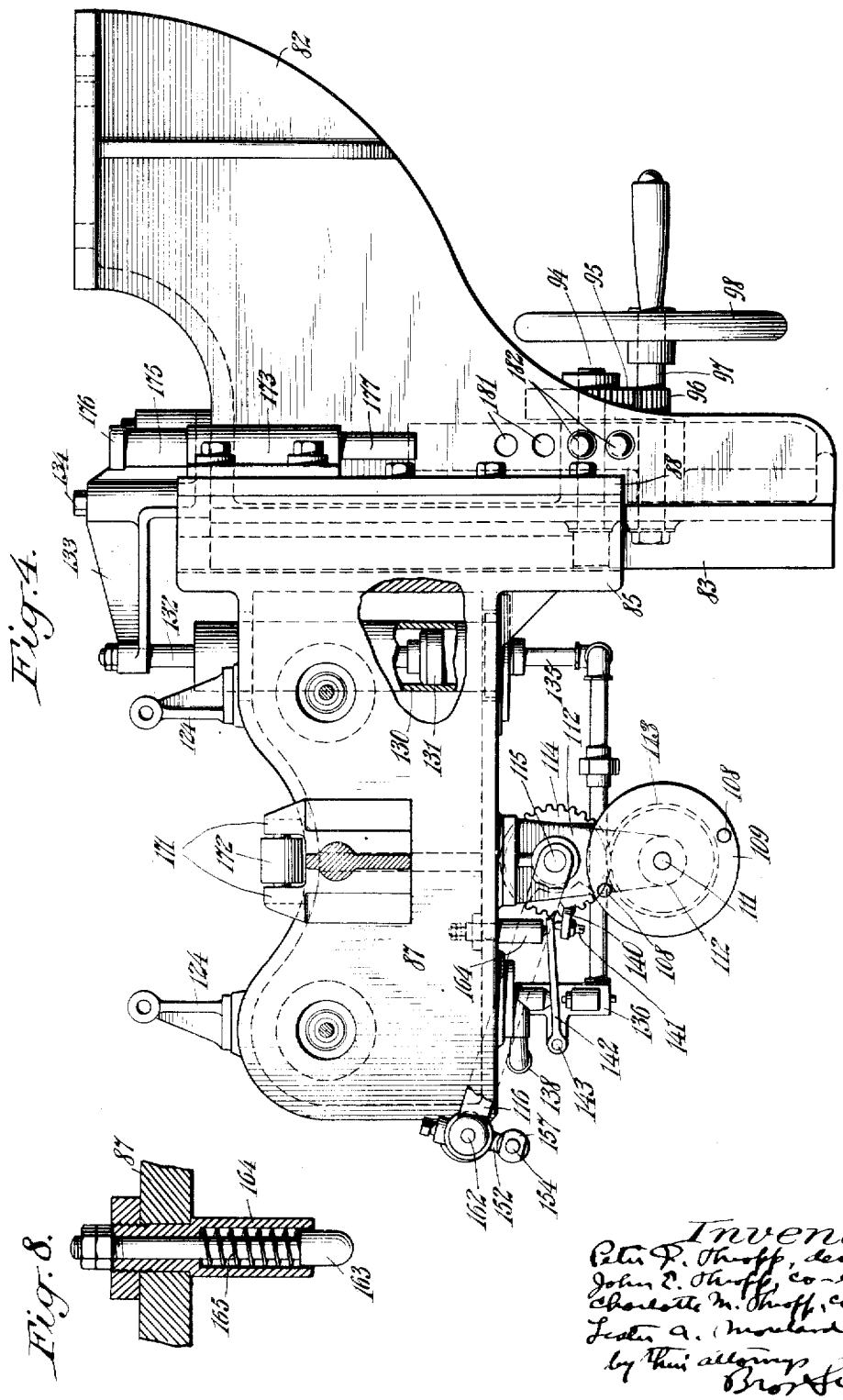

July 23, 1929. P. D. THROPP ET AL 1,721,842
TIRE MAKING MACHINE
Filed Jan. 13, 1923   5 Sheets-Sheet 5
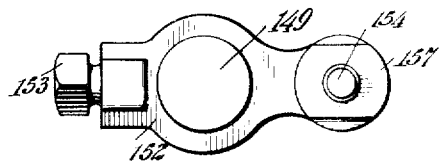
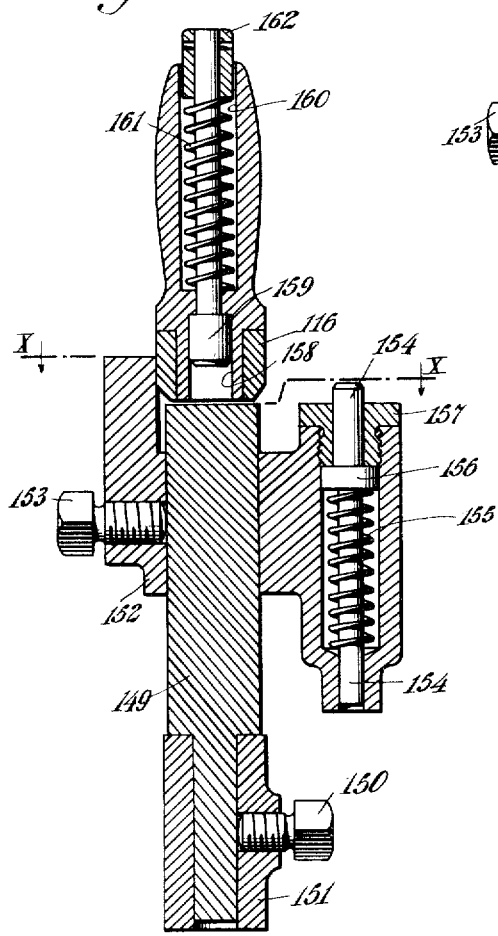
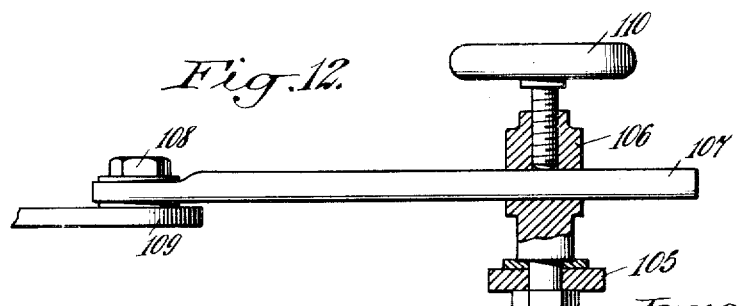

Patented July 23, 1929.

1,721,842

UNITED STATES PATENT OFFICE.

PETER D. THROPP, DECEASED, LATE OF TRENTON, NEW JERSEY, BY JOHN E. THROPP, COEXECUTOR, AND CHARLOTTE M. THROPP, COEXECUTRIX, AND LESTER A. MORELAND, OF TRENTON, NEW JERSEY, ASSIGNORS TO THE DE LASKI & THROPP CIRCULAR WOVEN TIRE COMPANY, OF TRENTON, NEW JERSEY, A CORPORATION OF NEW JERSEY.

TIRE-MAKING MACHINE.

Application filed January 13, 1923. Serial No. 612,553.

This invention relates to a tire making machine with the object in view of providing such an apparatus in which a tire may be expeditiously and accurately manufactured.

Another object consists in providing such a machine in which there is manually actuated means for moving the fabric forming or stitching mechanism radially inwardly with respect to the core, and automatic means for moving the said mechanism radially outwardly, the automatic means being under manual control.

Another object consists in providing certain improvements in the form, construction and arrangement of the several parts whereby the above named and other objects may be effectively attained.

A practical embodiment of our invention is represented in the accompanying drawings, in which Fig. 1 represents a plan view of a portion of the machine showing the mechanism for applying the fibrous material and tread of the tire to the core on which the tire is built.

Fig. 2 represents a similar view showing certain parts in different positions.

Fig. 3 represents a detail end view of the same with the mechanism for applying the fibrous material removed.

Fig. 4 represents a detail top plan view partly broken away, of the parts shown in Fig. 3, with the tread applying mechanism removed.

Fig. 5 represents a detail section, on an enlarged scale, through the valve mechanism for controlling the return of the carriage that supports the mechanism for applying the fibrous material and tread.

Fig. 6 represents a section, on the same scale, taken in the plane of the line VI—VI of Fig. 5, looking in the direction of the arrows, with the operative valve parts removed.

Fig. 7 represents a detail section, partly in elevation, on an enlarged scale, of the means for actuating the tread applying rollers.

Fig. 8 represents a detail section, on an enlarged scale, of the yielding contact for the arm which operates the valve mechanism shown in Fig. 5.

Fig. 9 represents a section, on an enlarged scale, of the abutment and locking mechanism for the arm which actuates the valve mechanism shown in Fig. 5.

Fig. 10 represents a view taken in the plane of the line X—X of Fig. 9, looking in the direction of the arrows, and on the same scale.

Fig. 11 represents a section, on an enlarged scale, of the yielding bumper for arresting the movement of the carriage that supports the mechanism for applying the fibrous material and tread.

Fig. 12 represents an elevation, partly in section, on an enlarged scale, of the means for securing the rear ends of the arms that carry the mechanism for applying the fibrous material to the means for actuating the said arms.

Figure 1:
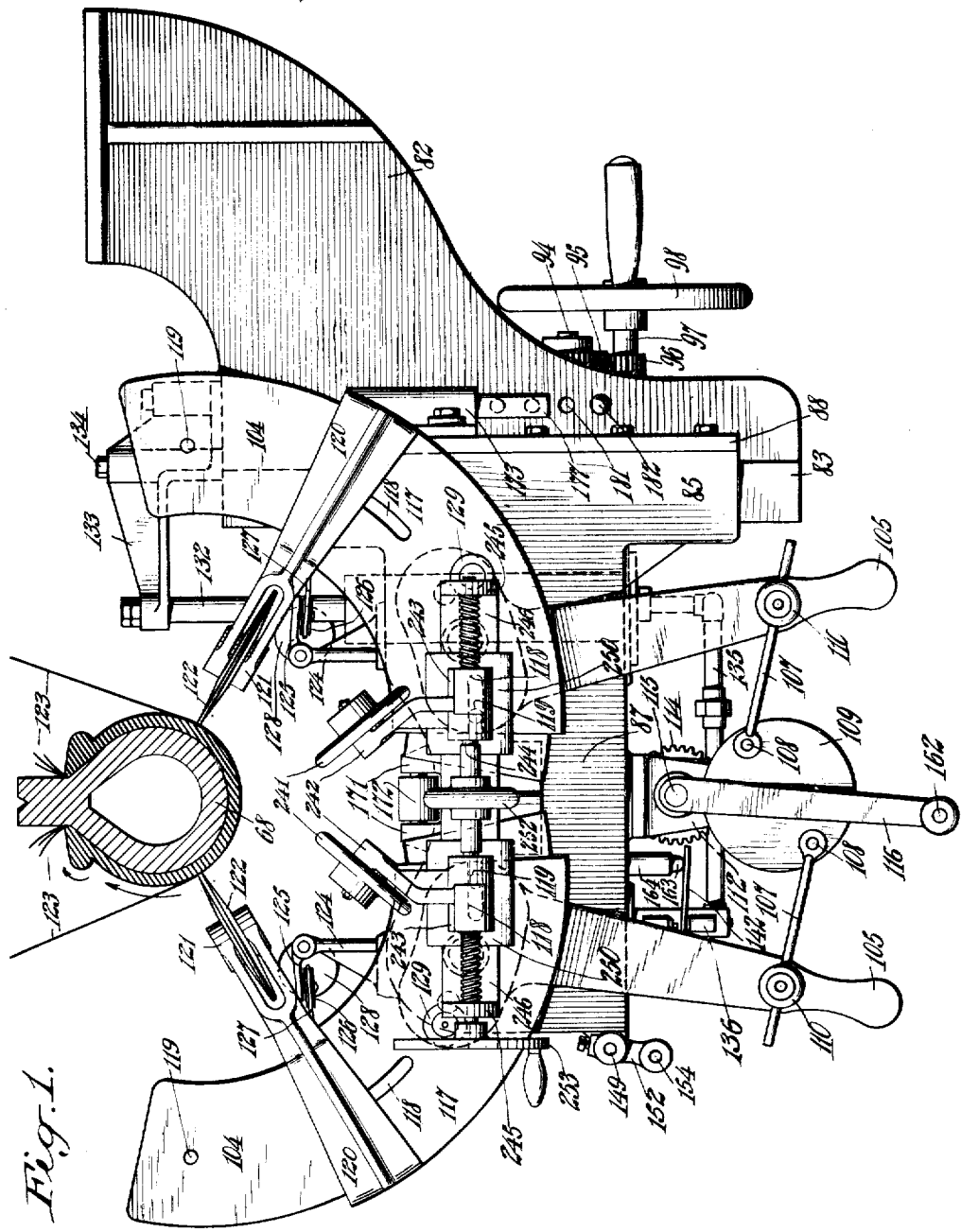

This machine constitutes an improvement on the general type of machine shown in United States Letters Patent to John E. Thropp, Peter D. Thropp and Albert De Laski, No. 1,119,326, dated December 1, 1914.

If it is desired to make so-called "fabric" tires, that is, tires of which the fibrous body portion is composed of square woven fabric, such as duck or canvas, which has been impregnated with rubber, the same may be supplied to the machine by mechanism such as that shown and described in the said Patent No. 1,119,326, it being understood that the said mechanism can be carried by the stanchion 48 as described in said patent. During this supplying of the fabric to the core, the latter is preferably rotated at slow speed, as described in said prior patent. If, on the other hand, it is desired to make so-called "cord" tires on the machine, the layers or strips of parallel cords impregnated with rubber would be supplied to the core in band formation, as is well understood in the art. In either case, the core is circumferentially embraced by one or more strips of fibrous material which adhere to the periphery and the side edges of which are intended to be shaped or formed down onto the sides of the core, as is also well understood in the art. The machine includes mechanism for thus forming the sides of the material to the core, which mechanism will now be described.

Referring to Fig. 1, a large bracket arm 82 is firmly secured to the side of the machine casing 1 and is provided with upper and lower rails 83, 84 (Fig. 3) which are adapted to receive flanges 85, 86 that project laterally from a carriage 87 so that the latter may slide upon the rails 83, 84. A pair of gibs 88, 89 are bolted to the face of the flanges 85, 86 in order to lock the carriage 87 in position on the bracket arm 82, and the usual bearing strips 90, 91 are interposed between the parts in order to facilitate movement.

The said elements are so arranged that the sliding movement of the carriage 87 takes place in a plane parallel to the plane of rotation of the core 68, so that the said movement may be described as being radial with respect to the core. This movement is manually accomplished by means of a rack 92 which is secured to the carriage 87 and mates with a pinion 93 that is fixed on a short shaft 94 that is mounted in the bracket arm 82 and has its other end provided with a gear 95 which meshes with a pinion 96 fixed on a stub shaft 97 that is mounted in the bracket arm 82. The shaft 97 has a hand wheel 98 secured to its protruding end, and it will be clear that the rotation of this hand wheel will, through the chain of mechanism just described, slide the carriage 87 in either direction desired along the rails 83, 84 on the bracket arm 82.

The carriage 87 is provided with a pair of recesses 99 at the bottom of each of which is located a ball bearing, denoted in general by 100 from which uprises a sleeve 101 that fits into another ball bearing 102 located at the top of each recess. A pin 103 is supported in the said bearings within the sleeve, and its upper end protrudes above the surface of the carriage 87 and is fixed to a curved arm 104 (Fig. 2). It will be understood that there are pairs of all the parts just described so that a pair of said curved arms 104 are pivoted, one in each of said recesses 99.

Each of the curved arms 104 has a handle 105 projecting rearwardly therefrom, and each of said handles carries an apertured stud 106 (see also Fig. 12) fitted to receive the ends of rods 107 which have their other ends pivotally secured, as shown at 108, to a disc 109. Clamping screws 110 threaded in the studs 106 serve to grip and release the rods 107 as may be desired.

The disc 109 (Fig. 3) is secured to the top of a pin 111 which has a bearing fitted in the end of a bracket 112 that is bolted to the carriage 87. The lower end of the pin 111 carries a gear 113 which meshes with another gear 114 (Fig. 4) that is carried on the lower end of a pin 115 which is also mounted in the bracket 112. The upper end of the pin 115 has a handle 116 (Fig. 1) fixed thereto. The effect of this arrangement is that manual swinging of the handle 116 will turn the gear 114 that meshes with the gear 113 and hence, rotate the disc 109. If the hand screws 110 are set so as to clamp the rods 107 to the handles 105 of the curved arms 104, this operation of the handle 116 will swing the last named arms about their pivots so that their inner curved ends will move laterally toward or away from the sides of the core 68.

The arms 104 are curved on the arc of a circle, and each one carries a similarly curved plate 117 which is adapted to slide thereon in an arcuate path. The plates 117 have slots 118 at their ends, which are adapted to impinge against pins 119 located near the ends of the arms 104 for the purpose of limiting the sliding movement of the plates 117. Each plate has secured thereto, at its outer end, a bracket 120 which projects inwardly in a lateral direction toward the core 68. The end of each bracket 120 is bifurcated and provided with a ball bearing 121 in which is rotatably mounted the hub of a disc or forming roll 122, which rolls are adapted to press the fibrous material 123 against the sides of the core and form it thereto. The operation of such forming rolls, both by hand and by machine is quite old and well understood in the industry.

A pair of brackets 124 project inwardly from the side of the carriage 87 and carry on their ends pivot arms 125 which support pulleys 126 that are fitted to receive cords 127, each of which has one end fast to one of the curved arms 104, while the other end carries a weight 128. The action of the weights will thus be to continuously urge the curved arms 104, and hence the forming rolls 122, toward the sides of the core 68, with equal pressure at all times.

When it is desired to form down the edges of the fibrous material 123 onto the sides of the core, handles 105 of the curved arms 104 may be locked to the disc 109, as already described, after which the operator with one hand moves the handle 116 in the proper direction so as to hold the forming rolls 122 apart from each other, against the action of the weights 128, about the distance shown in Fig. 1. With the other hand, the operator turns the hand wheel 98 so as to feed the carriage 87, and parts carried thereby, inwardly toward the core until the forming rolls 122 engage the material on the core about as shown in Fig. 1. The handles 105 on the curved arms 104 may now be released by turning the screws 110 so as to permit the weights 128 to act freely upon the arms 104. With the parts in this position, and with the core rotating preferably at high speed in order to expedite the work, the operator may continue to turn the wheel 98 and thereby feed the forming rolls 122 inwardly along the sides of the core until they have formed the loose edges of the material 123 thereto. In Fig. 1, we have shown a tire partially made on the core 68, and an additional layer of material being placed thereon, and it will be understood that the operation on each layer of material is the same except that the first few layers do not pass around the beads of the tire. The machine is adapted to completely form down all the layers of material whether they are to lie under or over the tire beads, this capacity for forming the layers over the beads being due to the curved shape and arrangement of the arms 104 and parts carried thereby, as fully shown, described and claimed in said United States Letters Patent No. 1,119,326. This operation need not, therefore, be fully described herein, but it may be mentioned that the position of the forming rolls 122 when forming the material along the bottom of the tire beads is shown in dotted lines in Fig. 2, this change of angle being accomplished by sliding the plates 117 on the arms 104 and locking them in the desired position by means of clamping screws 129 which are threaded into the plates 117 and adapted to bear against the arms 104.

After the said layer of material has been completely formed on the core or on the partially formed tire, as the case may be, the carriage 87 should be retracted in order to repeat the operation upon the next layer of material and, as this movement of retraction does not involve any active step in the manufacture of the tire, it is permissible to perform the same as quickly as possible and thereby economize time and reduce the cost of production. To this end, we provide means for automatically retracting the said carriage and parts mounted thereon, which means will now be described.

A cylinder 130 (Figs. 3 and 4) is mounted in the carriage 87 and embraces a piston 131 that is carried on a rod 132, the other end of which is secured to a bracket 133 that is bolted to the large bracket arm 82, as shown at 134. A pipe 135 is tapped into the head of the cylinder 130 and has its other end threaded into a valve housing 136 (see also Fig. 6) as indicated at 137. A pipe or flexible hose 138 is connected with the said valve housing 136, as shown at 139, which pipe leads from a suitable source of motive fluid supply, such as a compressed air tank, not shown. The said valve housing 136 contains moving parts which are designed to supply the compressed air to and cut it off from the cylinder 130, in order to retract the carriage 87 or permit its advancing movement, as may be desired; this operation being effected by movement of the handle 116, as will now be set forth.

After the forming rolls 122 have completed the laying of a layer of material on the sides of the core, the rods 107 are clamped to the handles 105 by means of the screws 110. The operator then swings the handle 116 to the left (Fig. 1) which movement, through the action of gear 114 and connected parts already described, serves to draw the handles 105 toward each other and thereby separate the forming rolls 122 from each other until they are a sufficient distance apart so as to clear the sides of the partly formed tire during the retracting movement of the carriage 87, as clearly shown in Fig. 2. The gear 114 which moves with the handle 116 carries a lug 140 (Fig. 4) in which is mounted an adjustable contact 141 and, after the handle 116 has been swung a considerable distance to the left, the said contact engages a flipper arm 142 which is pivoted at 143 in the valve housing 136. The engagement of the contact 141 with the flipper 142 causes the latter to impinge against and depress a valve 144 (Fig. 5) which is yieldingly seated in the valve housing 136 by a spring 145 and screw cap 146. This depression of the valve 144 will permit the compressed air entering through the hose 138 to pass through the port 147, by the head of the valve 144, downwardly through the port 148, and thence through pipe 135 into the cylinder 130. The compressed air entering the cylinder will at once act against the piston 131 and cause the cylinder to be immediately forced away from the said piston (which is fixed against movement in the bracket 133), thereby instantly and very rapidly retracting the carriage 87 and parts mounted thereon. A device is provided for holding the handle 116 in the operative position just described (see also Figs. 9 and 10) which device consists of a stud 149 which is secured, by means of a set screw 150 in a boss 151 which projects from an end of the carriage 87. A stop and locking member 152 is fastened to the upper portion of stud 149 by a set screw 153, which member projects above the stud 149 at one side, and at the other side is recessed in order to receive a pin 154. The said pin is normally urged upwardly by an expansion coil spring 155 which is interposed between the lower end of said recess and a collar 156 that is fixed to the said pin. The movement of the pin under influence of the spring is limited by a nut 157 which is screwed in the top of said recess. The arrangement of these parts is such that the top of the said nut is substantially level with the top of the stud 149, while the pin 154 can project a considerable distance above the nut. In the swinging movement of the handle 116, its lower surface moves in a plane just above that of the tops of the said nut and stud so that the handle will, in its movement, engage the side of the projecting end of the pin 154. It will be observed that these contacting portions of the handle and pin are beveled, as clearly shown in Fig. 9, so that the pressure exerted by the operator in swinging the handle 116 will cause it to depress and pass over the pin 154 until it abuts the portion of the member 152 which projects above the stud 149, thereby stopping any further swinging movement of the handle. It is while the parts are in this position that the air is admitted to the cylinder 130 and the carriage 87 thereby retracted, and it will be understood that the operator holds the handle 116 in abutment with the member 152 during the very short period of time required for the retraction of the said carriage. When this retracting movement has been completed, it is still desired to hold the carriage in its withdrawn position and to hold the forming rolls 122 apart while preparing for the succeeding step in the manufacture of the tire, and to this end, the operator swings the handle 116 backwards a slight distance until it passes over and is in line with the pin 154, whereupon the said pin, under the influence of the spring 155, at once enters a recess 158 formed in the bottom of the handle 116, and thereby locks the latter in its said position. A spring plunger 159 has its head located in the recess 158 and its shank in a bore 160 formed in the handle 116. This plunger is normally held in raised position by an expansion coil spring 161 which is interposed between the base of the bore 160 and a collar 162 that is pinned to the upper end of the plunger shank. When the operator desires to swing the handle 116 away from its locking engagement with pin 154, so as to continue the operation of the machine, he merely depresses the plunger 159 with his thumb, which movement depresses the pin 154 and unlocks the handle from engagement therewith so as to permit it to be swung back into the position shown, for instance, in Fig. 1. As the handle is thus swung back into the last named position, the contact 141 moves away from the flipper 142 so as to permit the latter to move out of contact with the valve 144. At this juncture, the said flipper 142 is swung in the opposite direction under the influence of a spring actuated plunger 163 (Fig. 8) which is contained in a housing 164 secured to the carriage 87 and provided with a spring 165 that normally urges it outwardly toward the said flipper. This opposite movement of the flipper will cause it to come into contact with and depress valve 166 (Fig. 5) that is located in the housing 136 and provided with a spring 167 and screw cap 168, as in the case of valve 144. This depressing of the valve 166 by the flipper 142 permits the air in the cylinder 130 to escape through the pipe 135, port 169, port 170, and exhaust into the atmosphere, thereby relieving the pressure in the cylinder 130 so as to permit the carriage 87 and parts mounted thereon to be advanced by manual operation of the hand wheel 98 during a subsequent step in the manufacture of the tire.

In order to prevent any portion of the carriage 87 from contacting with and injuring the partly formed tire on the core as the result of an excessive inward movement of the carriage, we provide the same with a pair of arms 171 (Fig. 2) which support between them a roll 172 that is in line with the central plane of rotation of the core, which roll may contact with the partly finished tire on the core without causing any injury thereto.

The retracting movement of the carriage 87, previously described, is effected in a rapid and forceful manner, so that we have found it desirable to provide means for limiting this movement and for absorbing the shock caused thereby. This means consists of a housing 173, that is shown on an enlarged scale in Fig. 11, which housing is fastened to the side of the gib 88. The housing is bored throughout its length, and is provided near one end with an internal flange 174. The end of the housing near the said flange is threaded and receives a cylinder 175 which has a separable end piece secured thereto by a screw cap 176. A plunger 177 has an elongated hub normally projecting from the end of the housing opposite the cylinder 175, while its shank passes through the bore of the said housing and flange 174 and has a flat head 178 which lies in the cylinder 175. An expansion coil spring 179 is interposed between the head of the plunger 177 and flange 174, and a piece of cushion rubber 180 is interposed between the head 178 and the end of the cylinder 175. It will be clear that the spring and the rubber cushion will serve to take up any blow or shock received on the end of the plunger 177. A series of holes 181 are formed in the top of the large bracket arm 82 in line with the axis of the said plunger, and are fitted to selectively receive a pin 182. By this arrangement of mechanism, the operator can insert the pin 182 in any desired one of the holes 181 and, when the carriage 87 is retracted by the action of the air in the cylinder 130, the head of the plunger 177 will eventually come into contact with pin 182 and thereby stop the backward movement of the carriage while at the same time absorbing the shock caused thereby. The provision of several holes 182 enables the backward movement of the carriage to be stopped at the most convenient position according to the size of the tire being made on the machine.

As the general operation of making automobile tires, both by hand and by machine, is so well understood in the art, and as the operation of the mechanism embodying our invention has been set forth in connection with the detail description of the mechanism, we do not consider it necessary to describe at length the operation thereof.

Various changes may be resorted to in the form, construction, and arrangement of the several parts without departing from the spirit and scope of our invention, so that we do not intend to be limited to the details herein shown and described except as the same may be included in the claims.

What we claim is:

1. A tire making machine comprising, means for rotatably supporting a core adapted to receive tire material, mechanism for forming the material on the sides of the core, manually actuated means for moving said forming mechanism radially inwardly with respect to the core, and manually controlled fluid actuated means for moving said forming mechanism outwardly.

2. A tire making machine comprising, means for rotatably supporting a core adapted to receive tire material, mechanism for forming the material on the sides of the core, manually actuated means for moving said forming mechanism radially inwardly with respect to the core, manually controlled fluid actuated means for moving said forming mechanism outwardly, and means for arresting and cushioning said outward movement of the forming mechanism.

3. A tire making machine comprising, means for rotatably supporting a core adapted to receive tire material, mechanism for forming the material on the sides of the core, means for moving said forming mechanism radially inwardly with respect to the core, means for moving said forming mechanism laterally with respect to the core, and fluid operated means for moving said forming mechanism radially outwardly with respect to the core, said fluid operated means being under control of the means for moving the forming mechanism laterally.

4. A tire making machine comprising, means for rotatably supporting a core adapted to receive tire material, mechanism for forming the material on the sides of the core, manually operable means for moving said forming mechanism radially inwardly with respect to the core, manually operable means for moving said forming mechanism laterally with respect to the core, and fluid operated means for moving said forming mechanism radially outwardly with respect to the core, said fluid operated means being under control of the means for moving the forming mechanism laterally.

5. A tire making machine comprising, means for rotatably supporting a core adapted to receive tire material, mechanism for forming the material on the sides of the core, means for moving said forming mechanism radially inwardly with respect to the core, manually operable means for moving said forming mechanism laterally with respect to the core, and fluid operated means for moving said forming mechanism radially outwardly with respect to the core, said fluid operated means being under control of the means for moving the forming mechanism laterally.

6. A tire making machine comprising, means for rotatably supporting a core adapted to receive tire material, mechanism for forming the material on the sides of the core, manually operable means for moving said forming mechanism radially inwardly with respect to the core, means for moving said forming mechanism laterally with respect to the core, fluid operated means for moving said forming mechanism radially outwardly with respect to the core, said fluid operated means being under control of the means for moving the forming mechanism laterally, and a device for locking said means for moving the forming mechanism laterally while the forming mechanism is in its outward position.

7. A tire making machine comprising, means for rotatably supporting a core adapted to receive tire material, mechanism for forming the material on the sides of the core, means for moving said forming mechanism radially inwardly with respect to the core, means for moving said forming mechanism laterally with respect to the core, fluid operated means for moving said forming mechanism radially outwardly with respect to the core, said fluid operated means being under control of the means for moving the forming mechanism laterally, and a device for locking said means for moving the forming mechanism laterally while the forming mechanism is in its outward position.

8. A tire making machine comprising, means for rotatably supporting a core adapted to receive tire material, mechanism for forming the material on the sides of the core, means for moving said forming mechanism radially inwardly with respect to the core, manually operable means for moving said forming mechanism laterally with respect to the core, fluid operated means for moving said forming mechanism radially outwardly with respect to the core, said fluid operated means being under control of the means for moving the forming mechanism laterally, and a device for locking said means for moving the forming mechanism laterally while the forming mechanism is in its outward position.

9. An apparatus of the character described comprising, means for rotatably supporting a core adapted to receive tire material, mechanism for forming the material on the core, means for moving the forming mechanism laterally away from the core after it has done work thereupon, and fluid actuated means for moving said forming mechanism radially away from the core, said automatic means being brought into operation by the completion of the operation of the means for moving the forming mechanism laterally.

10. An apparatus of the character described comprising, means for rotatably supporting a core adapted to receive tire material, mechanism for forming the material on the core, manually actuated means for moving the forming mechanism laterally away from the core after it has done work thereupon, fluid operated means for moving said forming mechanism radially away from the core, and a device controlling said fluid operated means, said device being engaged by a part of the manually actuated means for moving the forming mechanism laterally, whereby, at the completion of said manually actuated lateral movement the forming mechanism will be automatically moved radially away from the core.

11. An apparatus of the character described comprising, means for rotatably supporting a core adapted to receive tire material, mechanism for forming the material on the core, said mechanism including forming elements carried by pivoted arms, a manually actuated lever connected with said arms so that the swinging of said lever will move the forming elements laterally away from the core after they have done work thereupon, fluid operated means for moving said forming mechanism radially away from the core, and a valve controlling said fluid operated means, said valve being adapted to be operated by the movement of said lever so that the forming mechanism will be automatically moved radially away from the core.

12. A tire making machine comprising, means for rotatably supporting a core adapted to receive tire material, mechanism for forming the material on the sides of the core, manually actuated means for moving said forming mechanism radially inwardly with respect to the core, and manually controlled automatic means for moving said forming mechanism radially outwardly.

13. A tire making machine comprising, means for rotatably supporting a core adapted to receive tire material, mechanism for forming the material on the sides of the core, manually actuated means for moving said forming mechanism radially inwardly with respect to the core, automatic means for urging said mechanism laterally against the sides of the core with substantially equal pressure during said radial inward movement, and manually controlled automatic means for moving said forming mechanism radially outwardly.

In testimony, that we claim the foregoing as the joint invention of the said PETER D. THROPP, deceased, and said LESTER A. MORELAND, we have signed our names this 10th day of January, 1921.

JOHN E. THROPP,
*Coexecutor.*
CHARLOTTE M. THROPP,
*Coexecutrix of said Peter D. Thropp, Deceased.*
LESTER A. MORELAND

CERTIFICATE OF CORRECTION.

Patent No. 1,721,842.   Granted July 23, 1929, to

JOHN E. THROPP, Coexecutor, and CHARLOTTE M. THROPP,
Coexecutrix of PETER D. THROPP, Deceased.

It is hereby certified that error appears in the printed specification of the above numbered patent requiring correction as follows: Page 5, line 114, claim 9, for the word "automatic" read "fluid actuated"; and that the said Letters Patent should be read with this correction therein that the same may conform to the record of the case in the Patent Office.

Signed and sealed this 20th day of August, A. D. 1929.

(Seal)

M. J. Moore,
Acting Commissioner of Patents.

whereby, at the completion of said manually actuated lateral movement the forming mechanism will be automatically moved radially away from the core.

11. An apparatus of the character described comprising, means for rotatably supporting a core adapted to receive tire material, mechanism for forming the material on the core, said mechanism including forming elements carried by pivoted arms, a manually actuated lever connected with said arms so that the swinging of said lever will move the forming elements laterally away from the core after they have done work thereupon, fluid operated means for moving said forming mechanism radially away from the core, and a valve controlling said fluid operated means, said valve being adapted to be operated by the movement of said lever so that the forming mechanism will be automatically moved radially away from the core.

12. A tire making machine comprising, means for rotatably supporting a core adapted to receive tire material, mechanism for forming the material on the sides of the core, manually actuated means for moving said forming mechanism radially inwardly with respect to the core, and manually controlled automatic means for moving said forming mechanism radially outwardly.

13. A tire making machine comprising, means for rotatably supporting a core adapted to receive tire material, mechanism for forming the material on the sides of the core, manually actuated means for moving said forming mechanism radially inwardly with respect to the core, automatic means for urging said mechanism laterally against the sides of the core with substantially equal pressure during said radial inward movement, and manually controlled automatic means for moving said forming mechanism radially outwardly.

In testimony, that we claim the foregoing as the joint invention of the said PETER D. THROPP, deceased, and said LESTER A. MORELAND, we have signed our names this 10th day of January, 1921.

JOHN E. THROPP,
*Coexecutor.*
CHARLOTTE M. THROPP,
*Coexecutrix of said Peter D. Thropp, Deceased.*
LESTER A. MORELAND

CERTIFICATE OF CORRECTION.

Patent No. 1,721,842.  Granted July 23, 1929, to

JOHN E. THROPP, Coexecutor, and CHARLOTTE M. THROPP, Coexecutrix of PETER D. THROPP, Deceased.

It is hereby certified that error appears in the printed specification of the above numbered patent requiring correction as follows: Page 5, line 114, claim 9, for the word "automatic" read "fluid actuated"; and that the said Letters Patent should be read with this correction therein that the same may conform to the record of the case in the Patent Office.

Signed and sealed this 20th day of August, A. D. 1929.

(Seal)

M. J. Moore,
Acting Commissioner of Patents.